US008555052B2

(12) United States Patent
Chandramouli et al.

(10) Patent No.: US 8,555,052 B2
(45) Date of Patent: Oct. 8, 2013

(54) DATA HIDING BASED MESSAGES AND ADVERTISEMENTS

(75) Inventors: Rajarathnam Chandramouli, Holmdel, NJ (US); Koduvayur P. Subbalakshmi, Holmdal, NJ (US); Helena S. Wisniewski, Old Tappan, NJ (US)

(73) Assignee: The Trustees of The Stevens Institute of Technology, Hoboken, NJ (US)

( * ) Notice: Subject to any disclaimer, the term of this patent is extended or adjusted under 35 U.S.C. 154(b) by 249 days.

(21) Appl. No.: 12/064,976

(22) PCT Filed: Aug. 21, 2007

(86) PCT No.: PCT/US2007/076395
§ 371 (c)(1),
(2), (4) Date: Aug. 26, 2010

(87) PCT Pub. No.: WO2008/100336
PCT Pub. Date: Aug. 21, 2008

(65) Prior Publication Data
US 2010/0325413 A1 Dec. 23, 2010

Related U.S. Application Data

(60) Provisional application No. 60/889,629, filed on Feb. 13, 2007.

(51) Int. Cl.
*H04L 29/06* (2006.01)
*H04L 9/32* (2006.01)
*G06F 11/30* (2006.01)
*H04N 7/167* (2011.01)

(52) U.S. Cl.
USPC ............ 713/150; 713/176; 713/194; 380/202

(58) Field of Classification Search
USPC .................................................. 713/150–154
See application file for complete search history.

(56) References Cited

U.S. PATENT DOCUMENTS

| 5,819,092 | A | 10/1998 | Ferguson et al. |
| 6,154,771 | A | 11/2000 | Rangan et al. |
| 6,249,914 | B1 * | 6/2001 | Harrison et al. ............... 725/141 |

(Continued)

OTHER PUBLICATIONS

International Search Report corresponding to International Application No. PCT/US08/66917, entitled "Interactive Messages and Advertising". (3 pages).

(Continued)

*Primary Examiner* — Evans Desrosiers
(74) *Attorney, Agent, or Firm* — Greenberg Traurig, LLP

(57) ABSTRACT

A steganographic message/advertisement embedding method is presented that can be used for contextual and targeted advertising supporting unobtrusive and on-demand message/advertisement delivery. The present invention presents over two client devices, the method includes receiving, on a first client device, a primary multimedia presentation with a plurality of steganographic codes embedded therein; whereby the steganographic code is not perceivable during a rendering of the multimedia presentation and the steganographic code is associated with at least one secondary multimedia presentation. Next; the primary multimedia presentation is rendered on the first client device. The first client device receives a user selection to select at least one of the steganographic codes. In response to the user selection, a secondary multimedia presentation is presented to the user in response to receiving the user selection, wherein the second multimedia presentation is presented over a second client device which is distinct from the first client device.

14 Claims, 4 Drawing Sheets

(56) References Cited

U.S. PATENT DOCUMENTS

| | | | |
|---|---|---|---|
| 6,430,609 | B1 | 8/2002 | Dewhurst et al. |
| 6,774,926 | B1 * | 8/2004 | Ellis et al. .................. 348/14.01 |
| 6,775,392 | B1 | 8/2004 | Rhoads |
| 6,829,368 | B2 | 12/2004 | Meyer et al. |
| 6,877,006 | B1 | 4/2005 | Vasudevan |
| 7,095,871 | B2 | 8/2006 | Jones et al. |
| 7,188,085 | B2 | 3/2007 | Pelletier |
| 2003/0040957 | A1 | 2/2003 | Rodriguez et al. |
| 2003/0149621 | A1 | 8/2003 | Shteyn |
| 2005/0021611 | A1 | 1/2005 | Knapp et al. |
| 2005/0021989 | A1 * | 1/2005 | Johnson et al. ............... 713/194 |
| 2005/0220439 | A1 | 10/2005 | Carton et al. |
| 2005/0273491 | A1 | 12/2005 | Meyer et al. |
| 2007/0208805 | A1 | 9/2007 | Rhoads et al. |
| 2007/0276841 | A1 | 11/2007 | Rhoads et al. |

OTHER PUBLICATIONS

Written Opinion issued corresponding to International Application No. PCT/US08/66917. entitled "Interactive Messages and Advertising". (5 pages).

Matthew G. Nelson, The ClickZ Network, "VideoClix Enables Links in Videos, Tracks Metrics", Jan. 16, 2007, http://www.clickz.com/showPage.html?page=3624562, (1 page).

Nathan Segal, "VideoClix: Interactive Video Authoring", May 9, 2002, 2 pages. Nathan Segal, "VideoClix: Interactive Video Authoring (2)", May 9, 2002, 2 pages, Nathan Segal, "VideoClix: Interactive Video Authoring (3)", May 9, 2002, 2 pages, http://www.streamingmediaworld.com/video/docs/clix.

Marke Andrews, "Interactive Video System Delivers the Facts", Mar. 8, 2007, http://www.8051283.com/newsArticle-3041.html (3 pages).

TV Week, Digital Dealmakers, Babak Maghfourian, CEO of VideoClix, Dec. 9, 2007, http://www.tvweek.com/talking-tv/dealmakers/2007/12/babak__maghfourian__ceo__of__video.php (2 pages).

U.S. Appl. No. 60/943,978 on "Contextual Messages and Advertising", filed Jun. 14, 2007, Inventors: Rajarathnam Chandramouli, Koduvayur P. Subbalakshmi, Our Ref.: 101995-018900 (17 pages).

Notification of Transmittal of The International Search Report and The Written Opinion of the International Searching Authority, or the Declaration, International Patent Application No. PCT/US2007/076395, Data Hiding Based Messages and Advertisements, 8 pages.

* cited by examiner

DATA HIDING BASED MESSAGES AND ADVERTISEMENTS

CROSS REFERENCE TO RELATED APPLICATION

This application is based upon and claims priority from prior U.S. Provisional Patent No. 60/889,629, filed on Feb. 13, 2007 the entire disclosure of which is herein incorporated by reference in its entirety.

STATEMENT REGARDING FEDERALLY SPONSORED RESEARCH OR DEVELOPMENT

Not Applicable.

FIELD OF THE INVENTION

The present invention relates generally to message/advertisement, in particular, using data hiding methods, such as steganography, for embedding message/advertisements in digital and analog media.

BACKGROUND OF THE INVENTION

The message/advertisement industry is nearly $75 billion. Advertising agencies estimate nearly half of this amount to be wasted since many users do not prefer to view message/advertisements due to a variety of reasons. There are many drawbacks and shortcomings to known advertising delivery. One drawback is that advertisements often interrupt regular programming. It is well known that viewers often skip commercials by leaving the room during the interruption of their televised program and return at the end of the commercial, thereby missing the commercial completely.

More recently with the use of digital video recorders (DVR), such as TiVO, many viewers simply fast forward through the commercials to avoid being interrupted during regular broadcast and cable programming. This causes many commercials to be missed.

Further, currently there is no mechanism to time-shift the advertisements and other messages after the regular programming. Stated differently, viewers are not given a choice of when to view a particular commercial relative to the regular programming.

Another drawback from an individual user's perspective is that a specific message/advertisement may be irrelevant or not interesting. Advertisement and messages can be targeted by a geographic viewing region, but currently there is no mechanism to target a specific individual viewer within a geographic viewing region.

Another drawback is typical television based advertisement does not take advantage of alternate delivery methods such as printing, displaying a second audio/video presentation, e-mail, fax, wired and wireless handsets and more.

According what is needed is a method and system to overcome the aforementioned drawbacks encountered in the prior art and to provide an unobtrusive, low cost, user-initiated method that provides multiple delivery channels for advertisements and messages.

SUMMARY OF THE INVENTION

The present invention in one embodiment uses data hiding techniques such as steganography, to embed a message/advertisement in a primary program based on the context. In another embodiment, a link is placed in the primary program to a message/advertisement. The server side message/advertisement embedding or linking and client side selecting and optional decoding can be done in software, hardware or a combination. The receiver can decode the embedded advertisement on demand. The advertisement can be transmitted to a secondary device such as a printer, fax, computer, and other types of devices without interrupting the primary program or displayed in the primary device (where the primary program is viewed) using time-shifting.

In an embodiment where the present invention presents over two client devices, the method includes: receiving, on a first client device, a primary multimedia presentation with a plurality of steganographic codes embedded therein; whereby the steganographic code is not perceivable during a rendering of the multimedia presentation and the steganographic code is associated with at least one secondary multimedia presentation. Next; the primary multimedia presentation is rendered on the first client device. The first client device receives a user selection to select at least one of the steganographic codes. In response to the user selection, a secondary multimedia presentation is presented to the user in response to receiving the user selection, wherein the second multimedia presentation is presented over a second client device which is distinct from the first client device. In this embodiment, the secondary multimedia presentation is presented over the second client device including at least one of the following: a facsimile machine, a radio, a telephone, a cellular telephone, a pager, an instant messenger client, and an e-mail client. The secondary multimedia presentation includes at least one an advertisement, a message, a link to additional information, a webpage, and a coupon.

In an alternative embodiment the steganographic code is decoded on the first device prior to presenting the secondary multimedia presentation to the user on the second client device.

A bi-directional network connection with the second device in another alternative embodiment has been shown to be used advantageously with the present invention. One such bi-direction network connection is an internet connection which is separate and distinct from a channel by which the primary presentation is presented; and wherein the presenting of the secondary multimedia presentation to the user is performed by an information processing server receiving the user selection of at least one of the steganographic codes.

An indication may be used to alert the user during the primary presentation, the presence of at least one of the steganographic codes which is associated with the secondary multimedia presentation In an embodiment where the present invention presents over one client device, the method includes receiving, on a client device, a primary multimedia presentation with a plurality of steganographic codes embedded therein; whereby the steganographic code is not perceivable during a rendering of the multimedia presentation and the steganographic code is associated with at least one secondary multimedia presentation. Next the primary multimedia presentation is presented. In response to receiving a user selection to select at least one of the steganographic codes, the secondary multimedia presentation to the user in response to receiving the user selection, wherein the second multimedia presentation is presented after a time period when the primary multimedia presentation is completed. In this embodiment, it is important to note that the secondary multimedia presentation may be delivered over the same delivery channel as the primary presentation or over a different delivery channel, such as by mailing to a postal address of the user at least one of the following: printed material, a CD, a DVD and a tangible computer readable storage medium.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

The present invention has many advantages over the prior art system. One advantage is that the present invention embeds message/advertisement using data hiding techniques which are unobtrusive and does not interrupt the primary programming. Another advantage is that the advertisement is delivery upon request of the user and may be time-shifted after the primary presentation to be less obtrusive to the user.

In another embodiment, the advertisement is delivered over different channels to the user from the primary presentation such as printing, displaying a second audio/video presentation, e-mail, fax, wired and wireless handsets and more.

The present invention provides target messaging and advertising. In one embodiment, steganographic data hiding codes are used. Stenanographic codes are robust to distortions and alterations (e.g., distortions are caused due to image/video/audio compression, rotation and scaling digital data, corrupted bits, signal distortion due to environmental factors and more). The use of data hiding techniques works across the spatial domain, the time domain and the frequency domain.

Messages are embedded within a context of the regular programming and are also referred to as primary multimedia presentation. Data hiding codes provide a highly contextual message capacity where the secondary multimedia presentation itself is embedded and/or links are embedded, such as URLs, which point to the secondary multimedia presentation. Data hiding codes can also provide information security.

The present invention is low cost because existing hardware is used to enable this technology. Through the use of two way messaging such as back-channels, the present invention works is compliant with all international standards including analog and digital media such as T.V., radio, IPTV, cable TV, TiVo, Internet images, documents and more. This is a non-intrusive technology with a low cost overhead compared to existing solutions and products.

In one embodiment the data hiding codes create a two way messaging channel to a logging server (e.g., between the digital T.V. and advertising agencies) to track which users are watching the advertisements. It is important to note that the present invention allows the advertisers to select the target audience, geographical region, demography and more, as well as choose an advertisement to be associated with the primary content.

Overall System and Server-Side Embedding

Figure 1:
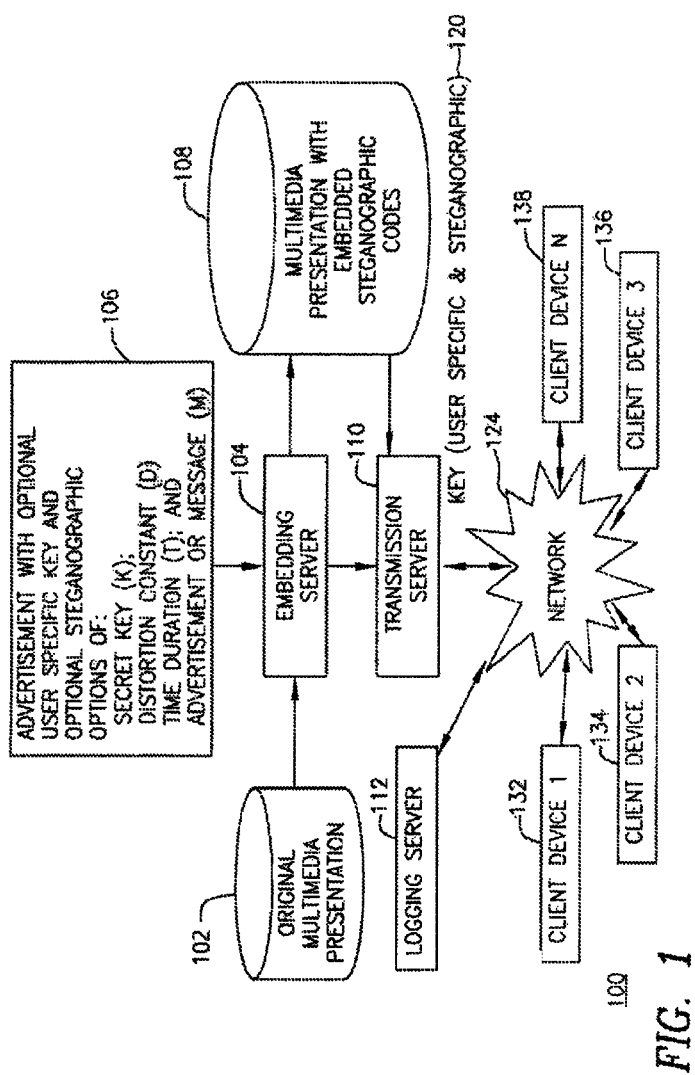
FIG. 1 is a diagram of an over-all system for embedding messages, according to the present invention.

Turning now to FIG. 1 is a diagram of the over-all system 100 for embedding messages. In one embodiment, the product message/advertisement will be directly embedded into the digital media transmission using steganographic algorithms without using any separate control channels. The embedded message/advertisement is imperceptible i.e., invisible and inaudible to a user. To denote the presence of a message, message indicators (such as a small logo at the bottom of the screen) will pop-up whenever the embedded additional multimedia message is available. When a consumer clicks on the content the hidden message/advertisement will be activated. The embedding may be done in the time domain, spatial domain or the frequency domain. Note that a similar framework can be used for embedding in other types of digital and analog media as well. The message/advertisement may be hidden in an analog T.V. signal (e.g., closed caption channel and more.) The present invention provides context based advertising. Traditionally, message/advertisement and primary program are orthogonal to each other, i.e., they do not overlap in time (and most of the time in space as well) and therefore the relevance to the primary presentation is poor. This makes skipping or removing messages/advertisements from the primary program an easy task. In the present invention, a context based advertising framework is used to directly embed the message/advertisement into the primary program using steganography. As seen in FIG. 1, the original or primary video program 102 is input to an message/advertisement embedding server 104. The server uses a subset of context specific video frames (in time or frequency domain) to imperceptibly hide the message/advertisement 106. In one embodiment as described further below a user specific key is used. FIG. 1 shows the working of the embedding server. In this embodiment, the primary multimedia or video program 102 is taken as input by the embedding or advertising server 104 that implements the steganographic algorithm. Although shown as part of a single system, it is important to note that the primary video program 102 can be stored remotely from the advertising server and delivered to the advertising server 132, 134, 136, 138 through any of variety means, within the true scope and spirit of the present, including wired and wireless networks including terrestrial and satellite networks. This is broadly designated as the telecommunications communication cloud 114. Further it is important to note, that although only a single telecommunications cloud 124 is shown, it is within the true scope and spirit of the invention to use other communications networks which are private between any of the designated components 102, 104, 106, 108, 110, 112, 132-138, such as Internet, satellite television or cable television. Along with the multimedia program 102, the advertising server receives other inputs 106. Optionally these inputs 106 include advertisements with optional parameters including user specific keys, a distortion constant for regulating the amount of induced distortion (D) during the embedding process, length or the time duration of the message/advertisement (t) and the message/advertisement (m). User specific key is useful in sending secure messages (e.g., coupons) to individual users. That is, even if some other user intercepts the message he/she cannot decrypt the embedded message. If the video content owner allows a higher amount of induced distortion then more messages can be embedded. Higher length/duration of message means the customer has more time to click and retrieve the messages. Higher message length may lead to higher average distortion to the video.

These optional parameters permit the embedding of the steganographic code to be regulated according to such factors as the terms and conditions promulgated by the copyright owner of the video program 102. These optional parameters may change how the message is embedded due to the bandwidth of the content delivery mechanism envisioned e.g. broadcast TV, wireless broadband such as G3 and G4 offerings; HDTV, IP TV, dial-up 124. The output of the advertising server 104 is primary multimedia presentation with an embedded message/advertisement 108.

Figure 2:
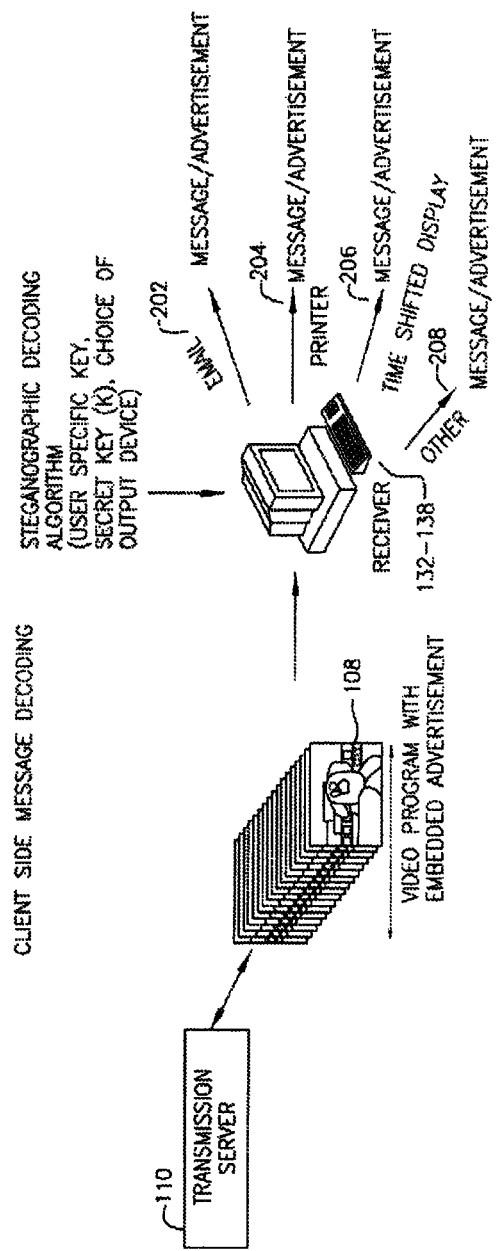
FIG. 2 is a diagram illustrating the process of client-side message decoding, according to the present invention.

In one embodiment, before the primary program with the message/advertisement is transmitted from a transmission server 110 to the receiver/client device 132, 134, 136, 138, a key 132, 134, 136, 138 is exchange step is executed as shown in FIG. 2. In this step the user specific key as well as the steganographic secret key (K) are transmitted to the client device 132, 134, 136, 138. The message/advertisement modulates the message carrier signal based on the key. The modulated carrier is added to the digital medium to obtain the medium with the embedded message/advertisement.

Although the client device 132, 134, 136, 138 is shown as a personal computer, it should be understood that any client device capable if rendering a multimedia presentation can be used. Client devices include set-top boxes, PDA, cell phones, DVD players and other consumer entertainment devices. In one embodiment the secret key is used to in conjunction with a message carrier so that the steganographic code is only decodable for a specific multimedia presentation or for a given broadcast station or channel, and/or for a given period of time and/or along with other parameters for limiting the decoding of steganographic codes. Further in combination with a the steganographic key (K) for a specific user of the client device 132, 134, 136, 138, the decoding may be further restricted to a given client device 130 or even a specific user on a client device 132, 134, 136, 138. This is important because it enables the tailoring of the message to the specific user of a specific machine. For example, messages may be tailored by gender, user interests, and other criteria. These interests can be provided to the advertising server 132, 134, 136, 138 during a process in which a specific advertisement/message is selected for a given user. This selection process is not shown and is well known in the internet and other media advertising fields and can be accomplished through viewer demographics, questionnaires, preferences, and other sources.

Still in another embodiment, the primary multimedia with the embedded steganographic codes 108 is transferred over DVDs, CDs, and other readable media to the client device 132, 134, 136, 138. NetFlix and BlockBuster offer such services today. A link to secondary multimedia message i.e. the advertised product or service is embedded in the host digital media (e.g., DVD MPEG movie). In another embodiment the complete message (secondary multimedia message) is embedded into the primary multimedia message. For example, the steganographic code can carry information or just a like to such information as: (a) which stores sell product in the locality, (b) whether there is a sale going on for this product; (c) whether the product is in stock; (d) what colors, models and sizes are available; and more.

In another embodiment of this invention, messages/advertisements can be embedded in the primary video program based on the audio content of the video scene. Consider the following example. A famous sportsman (e.g., Michael Jordan) gives a T.V. interview and says, "I keep fit by running 20 miles everyday and eating high protein food". At this time InStream logo will pop-up on the T.V. screen indicating hidden messages. Upon seeing this logo, if the consumer clicks on the video then embedded messages about the brand of shoes (e.g., Nike) the sportman wears and the shop where he buys high protein food (e.g., Whole Foods) is sent to the customer.

In still another embodiment, the embedding server 104 can embed the steganographic messages on the fly and the use of storage 108 for the multimedia presentation is eliminated.

Client-Side Decoding

FIG. 2 is a diagram illustrating the process of client-side message decoding, according to the present invention. As an example, consider the following scenario. A user watches a movie (in digital MPEG format) using a client device 132, 134, 136, 138 such as computer or DVD player. The hero in the movie drives a new model automobile. The manufacturer of the automobile embeds information about the automobile (e.g., make, model, maximum speed and more.) inside the video scenes where the automobile appears. In one embodiment, the user while watching the movie sees a small logo appear on the T.V. screen whenever the car is seen. The user presses a button in the remote control which in turn activates the message decoder in the client device. The embedded car information message/advertisement is displayed through a second client device e.g. e-mail 202, printer 204, text message 206, (and other device including telephone, pager, facsimile, instant message) or time-shifted 208 to be displayed after the primary presentation is finished.

If a user watches the embedded message/advertisement, this information can be sent to the cable operator or Internet service provider via a back channel, such as a telephone or internet connection (wireline or wireless or mesh network). This in-turn can be used by the advertising company to evaluate the effectiveness of the product placement.

The message/advertisement can be embedded directly into digital video, audio, image, html, word document, pdf document and other types of digital data. In one embodiment, a decoding algorithm is built in software, the set-top box in a cable T.V., TiVo (activated by a remote control button) and more. The users can then selectively choose to get more information about the products.

Steganographic codes will allow users to search for ads they are interested in.

User presses a button (in the remote control, software and more). In one embodiment, this action activates the decoding algorithm. Using the secret key used by the decoding algorithm, the decoder processes the digital medium in the reverse order as that of an encoder. The hidden or embedded message/advertisement is decoded and displayed to the user.

As described above the steganographic decoding algorithm at the client side takes as input the user specific key and the secret key. The embedded message/advertisement is decoded on demand and transmitted based on the choice of the user (printing, displaying a second audio/video presentation, e-mail, fax, wired and wireless handsets and more.) The primary program is not interrupted during the decoding and message/advertisement transmission process.

In another embodiment, the steganographic code is just a pointer or address or URL to the message or advertisement.

No decoding algorithm is needed. Rather than the message/advertisement being hidden, the steganographic code is a pointer and the user selection causes an address to be selected for sending the message/advertisement from a remote server.

It is important to note that the message/advertisement deliver to the user can occur from the client device itself 132, 134, 136, 138 or through a remote server such as transmission server 110 through when the embedded code is a link to a message stored remotely.

Message Delivery to User

Figure 3:
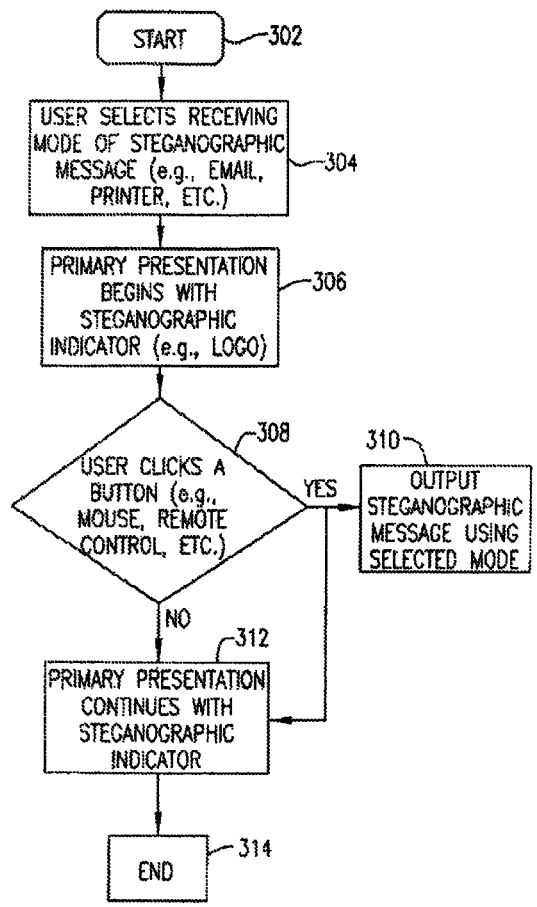
FIG. 3 is a flow chart illustrating the process of message delivery to the user according to the present invention.

FIG. 3 is a flow chart illustrating the process of message delivery to the user according to the present invention. FIG. 3 shows the steps involved in the steganographic message selection and optional decoding process. The process begins on step 302 and immediately proceeds to step 304. The user in step 304 first selects the mode of reception of the steganographic message such as the secondary multimedia presentation is delivered over facsimile. This selection can be stored in the client device as a preference or in another embodiment tailored to the user by the type of steganographic code. For example one steganographic code is used for a user preference delivery over another device such as e-mail and another steganographic code for time shifting. Then the primary program presentation begins. When a message/advertisement is present, a visible logo appears, and the user clicks a button (e.g. computer mouse or remote control) to select the message/advertisement in step 308. The message/advertisement is decoded by the decoding algorithm and then sent to the user via the a priori selected mode in step 310. Again this output is either to another device or time-shifted after the primary presentation. The primary programming continues uninterrupted in step 312 until the process completes in step 314.

As an alternative embodiment, upon the user clicking a button, a hidden URL address can point to additional information from a central server and transmit it to a user selected secondary device. This may allow different sellers to bid for the transmission of the message/advertisement.

As an alternative embodiment, the central server as shown in FIG. 1 schedules different message/advertisements to be embedded in the primary program based on the context, demography, user's history of clicks and more.

As an alternative embodiment, users may search for embedded messages/advertisements using an advertisement search engine. Messages/advertisements matching the user's search criteria can be delivered to a secondary device.

As an alternative embodiment, the embedded messages/advertisements can be delivered all at once to a secondary device at the click of a button either before, after or during the primary presentation.

Potential Partners for Present Invention

The present invention can be offered with digital video recorders such as TiVO to commercialize the product. TiVo is actively exploring product advertising technologies.

The present invention can be commercialized by partnering with the T.V. and radio stations, cable operators, Internet service providers and more.

Partner with movie industry for product placement inside digital movies.

Partner with gaming industry to embed message/advertisement inside games.

Partner with IPTV product manufacturers such as slingbox.

Partner with smartphone manufacturers and content providers.

Client Device Hardware

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 4:
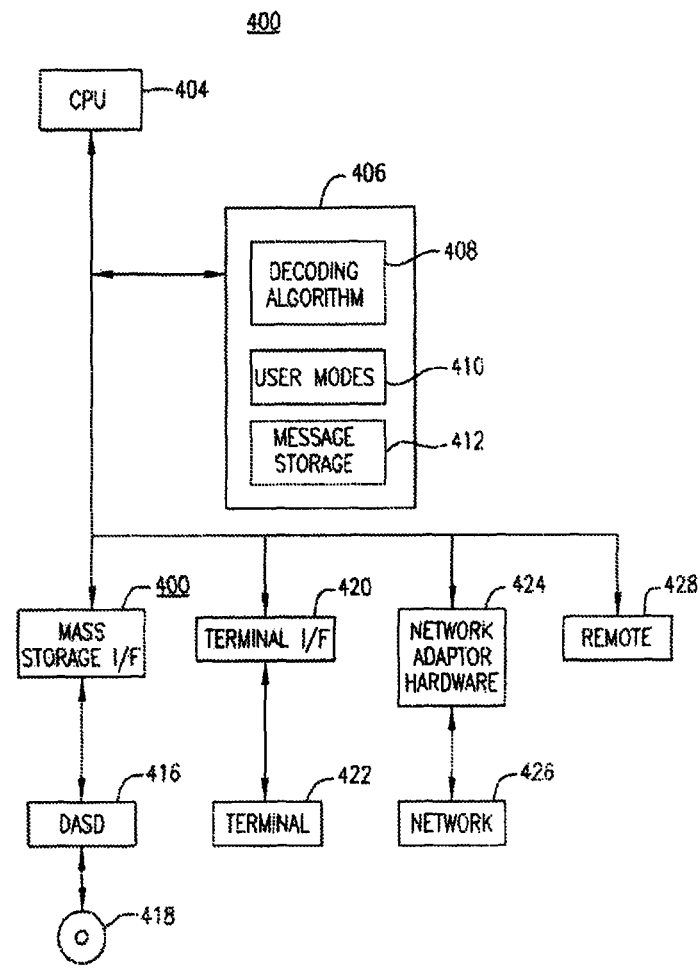
FIG. 4 is a generalized block diagram of a client device, such as a desktop computer or set-top box useful for implementing the noise cancellation algorithm according to the present invention.

FIG. 4 is a generalized block diagram of a client device 400 useful for implementing the advertisement decoding process according to the present invention. The mass storage interface 408 is used to connect mass storage devices, such as data storage device 416, to the information processing system 400. One specific type of data storage device is a computer readable medium such as DASD drive 416, which may be used to store data to and read data from a CD 418. The main memory 406 comprises the decoding algorithm of FIG. 3 including the user modes 410 and temporarily message storage 412 to be used after the message/advertisement is decoded and is being presented to the user. Movement. This has been discussed above in greater detail. Although illustrated as concurrently resident in the main memory 406, it is clear that respective component(s) of the main memory 406 are not required to be completely resident in the main memory 406 at all times or even at the same time.

Although only one CPU 404 is illustrated for client device 402, computer systems with multiple CPUs can be used equally effectively. Embodiments of the present invention further incorporate interfaces that each includes separate, fully programmed microprocessors that are used to off-load processing from the CPU 404. Terminal interface 410 is used to directly connect one or more terminals 420 to device 400 to provide a user interface to the client device 402. These terminals 422, which are able to be non-intelligent or fully programmable workstations, are used to allow system administrators and users to communicate with the client device 402. The terminal 422 is also able to consist of user interface and peripheral devices that are connected to client device 402 and controlled by terminal interface hardware included in the terminal I/F 420 that includes video adapters and interfaces for keyboards, pointing devices, and the like. Although not necessary a separate remote interface 428 is shown for infrared or wireless interface with remote controls.

An operating system (not shown) included in the main memory is a suitable multitasking operating system such as the Linux, UNIX, Windows, operating system. Embodiments of the present invention are able to use any other suitable operating system. Some embodiments of the present invention utilize architectures, such as an object oriented framework mechanism, that allows instructions of the components of operating system (not shown) to be executed on any processor located within the client device 402. The network adapter hardware 424 is used to provide an interface to the network 426. Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via CD or DVD, e.g. CD 418, CD ROM, or other form of recordable media, or via any type of electronic transmission mechanism.

Non-Limiting Examples

Even though a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method comprising: receiving, on a first client device, first data in the form of a primary multimedia presentation with second data in the form of a plurality of steganographic codes embedded therein, the steganographic codes being coincident with an associated portion of the primary multimedia presentation into which they are embedded to form a single, simultaneous data stream; whereby the steganographic codes are not perceivable during a rendering of the multimedia presentation and the steganographic codes are associated with at least one secondary multimedia presentation; rendering the primary multimedia presentation; receiving a user selection to select at least one of the steganographic codes; decoding the steganographic code on the first device and retrieving the secondary multimedia presentation from the data stream through the use of a steganographic key; presenting the secondary multimedia presentation to the user in response to receiving the user selection, wherein the second multimedia presentation is presented over a second client device which is distinct from the first client device.

2. The method of claim 1, wherein the secondary multimedia presentation is presented over the second client device including at least one of a facsimile machine, a radio, a telephone, a cellular telephone, a pager, a instant messenger client, and an e-mail client.

3. The method of claim 1, wherein the secondary multimedia presentation includes at least one an advertisement, a message, a link to additional information, a webpage, and a coupon.

4. The method of claim 3, wherein the presenting the secondary multimedia presentation to the user is performed through a bi-directional network connection with the second client device.

5. The method of claim 1, further comprising: sending the user selection to an information processing server over a back channel which is separate and distinct from a channel by which the primary presentation is presented; and wherein the presenting the secondary multimedia presentation to the user is performed by the information processing server.

6. The method of claim 1, further comprising: rendering an indicator to the user during the primary presentation to indicate a presence of at least one of the steganographic codes which is associated with the secondary multimedia presentation.

7. A method comprising: receiving, on a client device, first data in the form of a primary multimedia presentation with second data in the form of a plurality of steganographic codes embedded therein, the steganographic codes being coincident with an associated portion of the primary multimedia presentation into which they are embedded to form a single, simultaneous data stream; whereby the steganographic codes are not perceivable during a rendering of the multimedia presentation and the steganographic codes are associated with at least one secondary multimedia presentation coincident with an associated portion of the primary multimedia presentation into which it is embedded to form the single, simultaneous data stream; presenting the primary multimedia presentation; receiving a user selection to select at least one of the steganographic codes; retrieving the secondary multimedia presentation from the data stream through the use of a steganographic key; decoding the steganographic code on the first device and retrieving the secondary multimedia presentation from the data stream through the use of a steganographic key; and presenting the secondary multimedia presentation to the user in response to receiving the user selection, wherein the second multimedia presentation is presented after a time period when the primary multimedia presentation is completed.

8. The method of claim 7, wherein the secondary multimedia presentation is presented by mailing to a postal address of the user at least one of printed material, a CD, a DVD and a tangible computer readable storage medium.

9. A client video playback system comprising: at least one receiver for receiving first data in the form of a primary multimedia presentation with second data in the form of a plurality of steganographic codes embedded therein, the steganographic codes being coincident with an associated portion of the primary multimedia presentation into which they are embedded to form a single, simultaneous data stream; whereby the steganographic codes are not perceivable during a rendering of the multimedia presentation and the steganographic codes are associated with at least one secondary multimedia presentation; at least one video output communicatively coupled to a display for presenting the primary multimedia presentation to a user; at least one user input communicatively coupled to a user input device for receiving a user selection to select at least one of the steganographic codes; at least one processor executing programming instructions that in response to receiving the user selection, decoding the steganographic code on the first device and retrieving the secondary multimedia presentation from the data stream through the use of a steganographic key; and presenting the secondary multimedia presentation to the user wherein the second multimedia presentation is presented over a second client device which is distinct from the client device video playback system.

10. The client video playback system of claim 9, wherein the secondary multimedia presentation is presented over the second client device including at least one of a facsimile machine, a radio, a telephone, a cellular telephone, a pager, a instant messenger client, and an e-mail client.

11. The client video playback system of claim 9, wherein the secondary multimedia presentation includes at least one an advertisement, a message, a link to additional information, a webpage, and a coupon.

12. The client video playback system of claim 9, wherein the presenting the secondary multimedia presentation to the user is performed through a bi-directional network connection with the second client device.

13. The client video playback system of claim 9, further comprising: sending the user selection to an information processing server over a back channel which is separate and distinct from a channel by which the primary presentation is presented; and wherein the presenting the secondary multimedia presentation to the user is performed by the information processing server.

14. The client video playback system of claim 9, further comprising: rendering an indicator to the user during the primary presentation to indicate a presence of at least one of the steganographic codes which is associated with the secondary multimedia presentation.

* * * * *